Oct. 28, 1924.
E. D. SMITH
CARBIDE DISPENSER
Filed Jan. 12, 1924
1,513,563
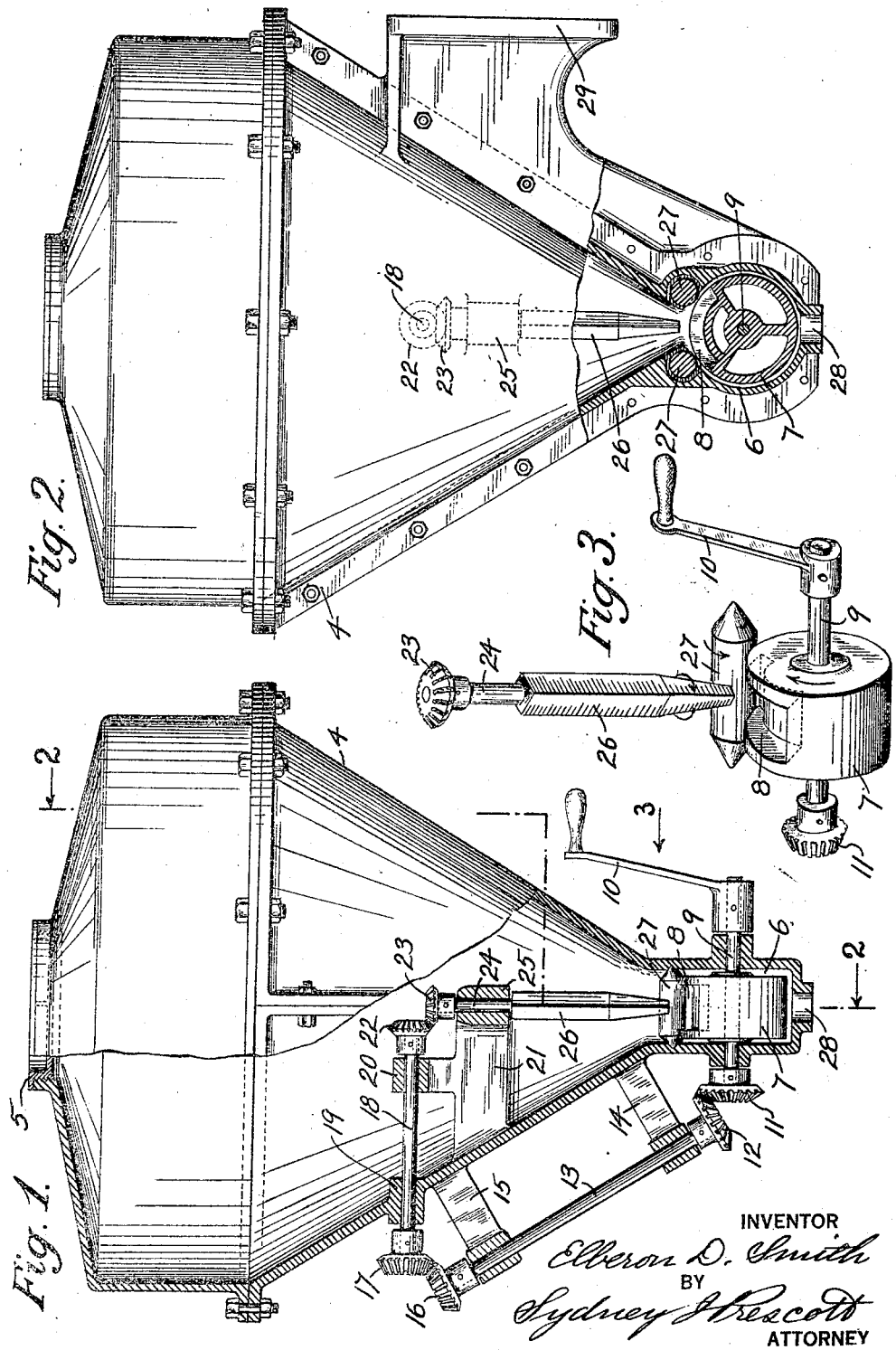
INVENTOR
Elberon D. Smith
BY
Sydney Prescott
ATTORNEY Patented Oct. 28, 1924.

1,513,563

UNITED STATES PATENT OFFICE.

ELBERON D. SMITH, OF BROOKLYN, NEW YORK, ASSIGNOR TO AMERICAN MACHINE & FOUNDRY COMPANY, A CORPORATION OF NEW JERSEY.

CARBIDE DISPENSER.

Application filed January 12, 1924. Serial No. 685,819.

*To all whom it may concern:*

Be it known that I, ELBERON D. SMITH, a citizen of the United States, residing at Brooklyn, county of Kings, and State of New York, have invented a new and useful Improvement in Carbide Dispensers, of which the following is a specification.

This invention relates to an improvement in carbide dispensers particularly adapted to hold a supply of carbide, to break it up as needed, and to feed at each operation a sufficient quantity to fill a lamp. With these and other objects not specifically mentioned in view, the invention consists in certain constructions and combinations which will be hereinafter fully described and then specifically set forth in the claims hereunto appended.

In the accompanying drawings, which form a part of this specification and in which like characters of reference indicate the same or like parts, Fig. 1 is a side elevation, partly in section, of a device constructed in accordance with the invention; Fig. 2 is a front elevation, partly in section, of the structure shown in Fig. 1; and Fig. 3 is a detailed view of the measuring and carbide breaking devices shown in Figs. 1 and 2.

In carrying the invention into effect, there is provided a hopper for containing a supply of coarse carbide, a measuring device below the hopper for dispensing individual charges of carbide, and means for breaking up the carbide at the bottom of the hopper and directly over the measuring device. These various parts may be widely varied in construction within the scope of the claims, for the particular device selected to illustrate the invention is but one of many possible concrete embodiments of the same. The invention therefore is not to be restricted to the precise details of the structure shown and described.

Referring to the drawings, 4 indicates a hopper constructed of parts bolted together and adapted to contain a supply of coarse carbide.

The hopper 4 is supplied with a cap 5 screwed into its top, and through the opening which is closed by this cap carbide may be introduced into the hopper.

The bottom or delivery end of the hopper is in the form of a cylindrical chamber 6, and mounted in this chamber is a cylindrical measuring device 7 provided with a peripheral pocket 8. The measuring device is fast on a shaft 9 journaled in suitable bearings in the wall of the chamber 6 and projecting beyond said wall in both directions. A handle 10 is fast on one end of the shaft 9 outside the hopper, and by means of this handle the measuring device can be rotated. Upon the opposite end of the shaft 9 is fixed a bevel gear 11 meshing with a bevel gear 12 fast on a shaft 13. This shaft is journaled in bearings formed on brackets 14, 15 extending from one wall of the hopper 4. Upon the upper end of the shaft 14 is fixed a bevel gear 16 which meshes with and drives a bevel gear 17 fast on a shaft 18 journaled in a bearing formed in the wall of the hopper 4, and in a bearing 20 formed on a bracket 21 within the hopper. Within the hopper the shaft 18 carries a bevel gear 22 which is in mesh with and drives a bevel gear 23 fast on the upper end of a shaft 24 journaled in a bearing 25 formed on the bracket 21 before referred to. By an inspection of Fig. 1, it will be readily understood that when the handle 10 is operated to rotate the shaft 9, the shaft 24 will also be rotated through the agency of the gearing just described.

The lower end of the shaft 24 is in the form of a polygonal spindle 26 which rotates on the axis of the hopper and which terminates in the mouth of the hopper just above the measuring device 7. Located in the mouth of the hopper adjacent the lower end of the spindle 26 and just above the measuring device 7, are two idle rollers 27 which coact with the spindle 26 to break up the carbide in the lower end of the hopper and cause the pocket 8 of the measuring device 7 to be filled with the broken up carbide when said pocket is in the position shown in the drawings. It will be readily understood that when the measuring device 7 is rotated from the pocket charging position shown in the drawings to a position 180 degrees therefrom, the carbide contained within the pocket will fall through an aperture 28 provided in the bottom of the hopper below the chamber 6, and that a lamp held under this aperture will be properly filled.

The hopper 4 is provided with a side bracket 29 by means of which it may be secured to a wall or other suitable support.

What is claimed is:

1. A carbide dispenser comprising a hopper, a measuring device below said hopper, and means for breaking up the carbide at the bottom of said hopper and over said device said means including a polygonal spindle rotating on the vertical axis of said hopper.

2. A carbide dispenser comprising a hopper, a measuring device below said hopper, and means for breaking up the carbide at the bottom of said hopper and over said device said means including a polygonal spindle rotating on the vertical axis of said hopper and a pair of transverse idle rollers in the mouth of said hopper.

3. A carbide dispenser comprising a hopper, a measuring device below said hopper, and means for breaking up the carbide at the bottom of said hopper and over said device, said device being a rotatable drum having a peripheral pocket formed therein, and said means including a polygonal spindle rotating on the vertical axis of said hopper and a pair of transverse idle rollers in the mouth of said hopper, and gearing connecting said drum and said spindle.

In testimony whereof, I have signed my name to this specification.

ELBERON D. SMITH.